United States Patent
Klemen et al.

(10) Patent No.: US 10,676,198 B2
(45) Date of Patent: Jun. 9, 2020

(54) DISTRIBUTED PROPULSION SYSTEMS

(71) Applicant: Rolls-Royce Corporation, Indianapolis, IN (US)

(72) Inventors: Donald Klemen, Carmel, IN (US); Michael James Armstrong, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 582 days.

(21) Appl. No.: 15/601,969

(22) Filed: May 22, 2017

(65) Prior Publication Data

US 2017/0349293 A1     Dec. 7, 2017

Related U.S. Application Data

(60) Provisional application No. 62/344,687, filed on Jun. 2, 2016.

(51) Int. Cl.
   *B64D 27/24*     (2006.01)
   *B65D 27/02*     (2006.01)
   (Continued)

(52) U.S. Cl.
   CPC .............. *B64D 27/24* (2013.01); *B60L 1/003* (2013.01); *B60L 1/02* (2013.01); *B60L 1/14* (2013.01);
   (Continued)

(58) Field of Classification Search
   CPC ................................. B64D 27/24; B64D 27/02
   (Continued)

(56) References Cited

U.S. PATENT DOCUMENTS

| 7,104,499 | B1 | 9/2006 | Arata |
| 8,395,274 | B2 | 3/2013 | Nelson et al. |

(Continued)

FOREIGN PATENT DOCUMENTS

| EP | 2801719 A1 | 11/2014 |
| WO | 2013079972 A1 | 6/2013 |
| WO | 2014158240 A2 | 10/2014 |

OTHER PUBLICATIONS

Epstein, "Distribution Propulsion: New Opportunities for an Old Concept", Final Technical Report, Dec. 2007, 144 pgs.
(Continued)

*Primary Examiner* — David Luo
(74) *Attorney, Agent, or Firm* — Shumaker & Sieffert, P.A.

(57) ABSTRACT

A system includes at least one compressor, at least two turbines, and at least two combustors, each fluidically coupled to a respective turbine of the at least two turbines and configured to receive compressed fluid from the at least one compressor. The system further includes at least two motor-generators, each operably coupled to a respective turbine of the at least two turbines and configured to convert electrical energy to mechanical energy to drive a respective propulsor to which the respective motor-generator is operably coupled and to convert mechanical energy from the respective turbine to electrical energy. The system further includes at least two propulsors, each operably coupled to a respective turbine of the at least two turbines and configured to be driven by the respective turbine, a respective motor-generator to which the respective propulsor is operably coupled via the respective turbine, or both the respective turbine and the respective motor-generator.

20 Claims, 9 Drawing Sheets

(51) Int. Cl.
  *B60L 1/14* (2006.01)
  *B60L 1/02* (2006.01)
  *B60L 1/00* (2006.01)
  *B60L 50/15* (2019.01)
  *B64D 27/02* (2006.01)

(52) U.S. Cl.
  CPC .............. *B60L 50/15* (2019.02); *B64D 27/02* (2013.01); *B60L 2200/10* (2013.01); *Y02T 10/7077* (2013.01)

(58) Field of Classification Search
  USPC .................................................. 318/140, 141
  See application file for complete search history.

(56) References Cited

U.S. PATENT DOCUMENTS

| | | | |
|---|---|---|---|
| 9,096,312 B2 | 8/2015 | Moxon | |
| 9,479,037 B2* | 10/2016 | Bailey | .................. H02K 21/024 |
| 2009/0097959 A1 | 4/2009 | Vos et al. | |
| 2009/0145998 A1 | 6/2009 | Salyer | |
| 2012/0209456 A1 | 8/2012 | Harmon et al. | |
| 2014/0159371 A1 | 6/2014 | Hugo et al. | |
| 2015/0284071 A1 | 10/2015 | Veilleux, Jr. et al. | |
| 2015/0367950 A1 | 12/2015 | Rajashekara et al. | |

OTHER PUBLICATIONS

Kim et al., "Distributed Propulsion Vehicles", 27th International Congress of the Aeronautical Sciences, Sep. 2010, 11 pgs.

Airbus Group Innovations, "The Vision and Perspective of an Electrical Distributed Propulsion System" May 2014, 8 pgs.

Felder et al., "Turboelectric Distributed Propulsion Engine Cycle Analysis for Hybrid-Wing-Body Aircraft", Sep. 2007, 25 pgs.

* cited by examiner

DISTRIBUTED PROPULSION SYSTEMS

This application claims the benefit of U.S. Provisional Application No. 62/344,687 filed Jun. 2, 2016, which is incorporated herein by reference in its entirety.

TECHNICAL FIELD

This disclosure relates to distributed propulsion systems.

BACKGROUND

A gas turbine engine is a type of internal combustion engine that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, and other devices and loads including an electric generator. The propulsor may use the energy from the rotating shaft to provide propulsion for the system.

SUMMARY

In some examples, the disclosure describes a system that includes at least one compressor, at least two turbines, and at least two combustors, where a respective combustor of the at least two combustors is fluidically coupled to a respective turbine of the at least two turbines, and where the at least two combustors are configured to receive compressed fluid from the at least one compressor. The system further includes at least two motor-generators, where each respective motor-generator of the at least two motor-generators is operably coupled to a respective turbine of the at least two turbines. Each respective motor-generator of the at least two motor-generators is configured to convert electrical energy to mechanical energy to drive a respective propulsor to which the respective motor-generator is operably coupled and to convert mechanical energy from a respective turbine to which the respective motor-generator is operably coupled to electrical energy. The system further includes at least two propulsors, where each respective propulsor of the at least two propulsors is operably coupled to a respective turbine of the at least two turbines, where each respective propulsor of the at least two propulsors is configured to be driven by the respective turbine to which the respective propulsor is operably coupled, a respective motor-generator to which the respective propulsor is operably coupled via the respective turbine, or both the respective turbine and the respective motor-generator.

In some examples, the disclosure describes a controller configured to selectively cause each respective propulsor of at least two propulsors of a system to be driven by a respective turbine to which the respective propulsor is operably coupled. The controller is further configured to selectively cause each respective propulsor of the at least two propulsors to be driven by a respective motor-generator to which the respective propulsor is operably coupled via the respective turbine. The controller is further configured to selectively cause each respective propulsor of the at least two propulsors to be driven by a respective motor-generator and a respective turbine, wherein the system includes at least two turbines, at least two motor-generators, at least one compressor, and at least two combustors, wherein each respective turbine is fluidically coupled to a respective combustor of the at least two combustors, wherein each respective combustor is configured to receive compressed fluid from the at least one compressor, and wherein each respective motor-generator is configured to convert electrical energy to mechanical energy to drive a respective propulsor to which the respective motor-generator is operably coupled and to convert mechanical energy from a respective turbine to which the respective motor-generator is operably coupled to electrical energy.

In some examples, the disclosure describes a method that includes selectively causing each respective propulsor of at least two propulsors of a system to be driven by a respective turbine to which the respective propulsor is operably coupled. The method further includes causing each respective propulsor of the at least two propulsors to be driven by a respective motor-generator to which the respective propulsor is operably coupled via a respective turbine. The method further includes selectively causing each respective propulsor of the at least two propulsors to be driven by a respective motor-generator and a respective turbine, wherein the system includes at least two turbines, at least two motor-generators, at least one compressor, and at least two combustors, wherein each respective turbine is fluidically coupled to a respective combustor of the at least two combustors, wherein each respective combustor is configured to receive compressed fluid from the at least one compressor, and wherein each respective motor-generator is configured to convert electrical energy to mechanical energy to drive a respective propulsor to which the respective motor-generator is operably coupled and to convert mechanical energy from a respective turbine to which the respective motor-generator is operably coupled to electrical energy.

The details of one or more examples are set forth in the accompanying drawings and the description below. Other features, objects, and advantages will be apparent from the description and drawings, and from the claims.

DETAILED DESCRIPTION

Figure 1:
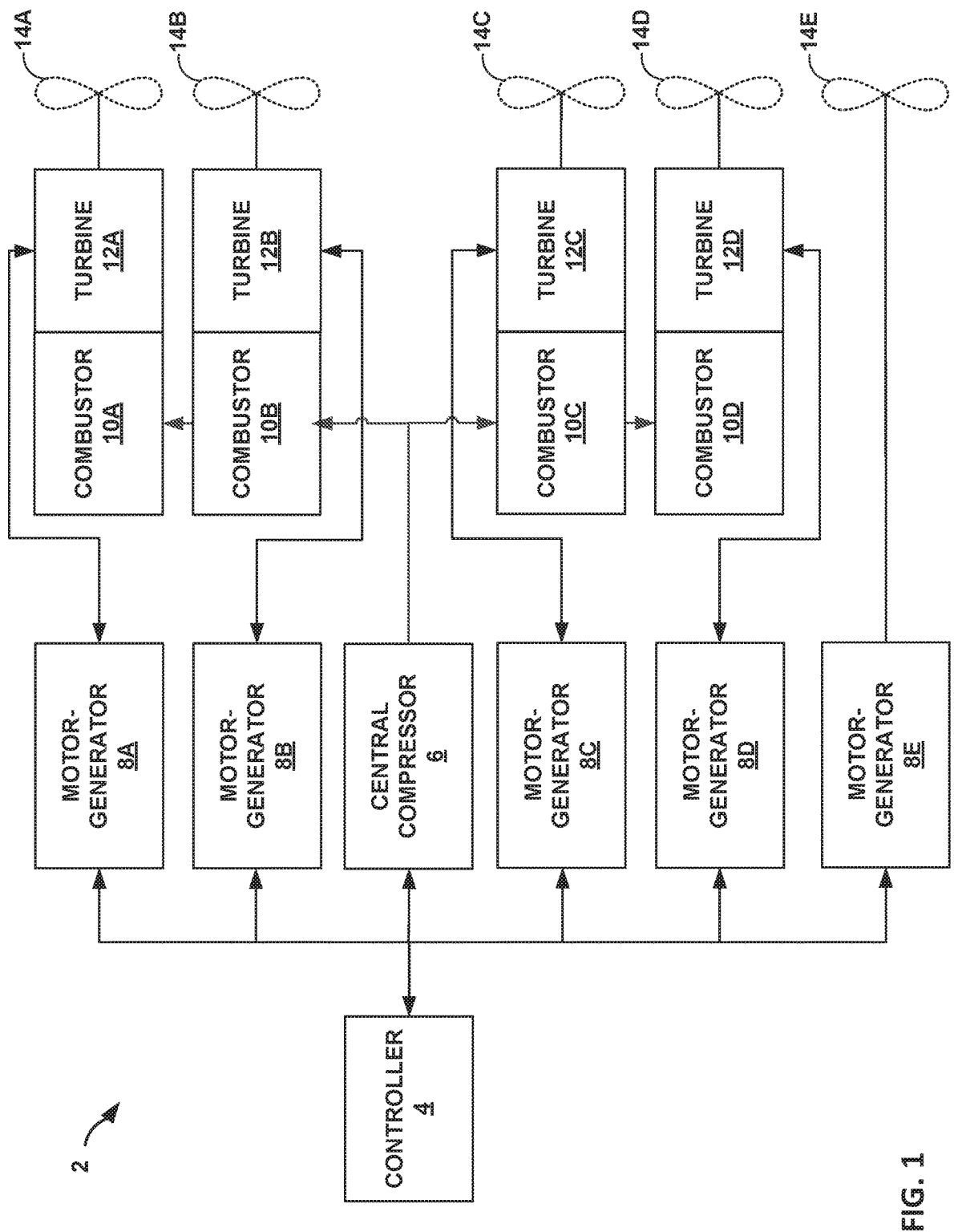
FIG. 1 is a conceptual block diagram illustrating a system with at least two turbines and at least two motor-generators, in accordance with one or more techniques of this disclosure.

Aircraft and other systems with gas turbine engines consume energy to create propulsion and to power electrical loads. A gas turbine engine may include a turbine (e.g., at least one turbine), a compressor (e.g., at least one compressor), and a combustor (e.g., at least one combustor). In some examples of this disclosure, a gas turbine engine may be an integral machine (e.g., all of the at least one turbine, at least one compressor, and at least one combustor are part of a single mechanical engine). In other examples of this disclosure, a gas turbine engine may be a distributed system, and there may not be a one-to-one correspondence in the number of compressors to the number of turbines. For example, one or more central compressors may compress fluid and provide the compressed fluid to at least two turbines that are each coupled to respective propulsors.

This disclosure describes techniques for controlling individual turbines to operate on fuel, operate on electrical power, to generate electrical power, or to disable by operably coupling a respective motor-generator of at least two motor-generators to each respective turbine of at least two turbines. The techniques of this disclosure allow a variety of modes of operation, including vectored propulsion, transient power distribution for propulsion or transient electrical loads, stealth mode, and the like. Each of the motor-generators may convert electrical energy to mechanical energy to drive a respective turbine and a respective propulsor to create propulsion. Each motor-generator may also convert mechanical energy from a respective turbine or a respective propulsor into electrical energy to drive electrical loads in the system, including other turbines and propulsors.

According to the techniques of this disclosure, a controller may cause the motor-generators and turbines to distribute power throughout the system. For example, the controller may selectively cause one or more of the turbines to extract mechanical power from combusted fluid, e.g., to provide shaft power to the propulsor and provide propulsion to the system. In this way, the controller may selectively cause one or more of the turbines to run on fuel. The controller also may selectively cause one or more of the motor-generators to convert electrical power from storage into mechanical power to drive the gas turbine engines and respective propulsors. In this way, the controller may selectively cause one or more of the turbines to run on electrical power or a combination of fuel and electrical power. The controller also may selectively cause one or more of the motor-generators to convert mechanical power from one or more of the respective turbines to electrical power, which the controller may cause to be provided to another one or more of the motor-generators (e.g., to power the respective turbines to which the another one or more of the motor-generators are operably coupled) or to energy storage (e.g., a battery). In some examples, the controller may substantially simultaneously control each respective turbine and each respective motor-generator independently, such that respective ones of the turbines and respective ones of the motor-generators may be operating similarly or differently.

Thus, according to the techniques of this disclosure, the controller may individually control the gas turbine engines to operate on fuel, operate on electrical power, to generate electrical power, or to disable. The techniques of this disclosure may enable a versatile system with multiple power sources and multiple modes of operation, along with potentially reduced fuel consumption and lower operating costs.

FIG. 1 is a conceptual block diagram illustrating a system 2 with at least two turbines 12A-12D (collectively, "turbines 12") and at least two motor-generators 8A-8E (collectively, "generators 8"), in accordance with one or more techniques of this disclosure. System 2 may be any system implementing at least two turbines, such as an aircraft, a locomotive, a watercraft, or an electric generator.

Within system 2, each motor-generator of motor-generators 8 may be operably coupled to a respective turbine of turbines 12. Each turbine of turbines 12 may be operably coupled to a respective propulsor of at least two propulsors 14A-14E (collectively, "propulsors 14"). Although FIG. 1 depicts system 2 with one controller 4 and one compressor 6, in other examples, system 2 may include more than one controller 4, more than one compressor 6, or both. Similarly, system 2 may contain more or fewer than four of each of motor-generators 8, at least two combustors 10A-10D (collectively, "combustors 10"), turbines 12, and propulsors 14.

Figure 2:
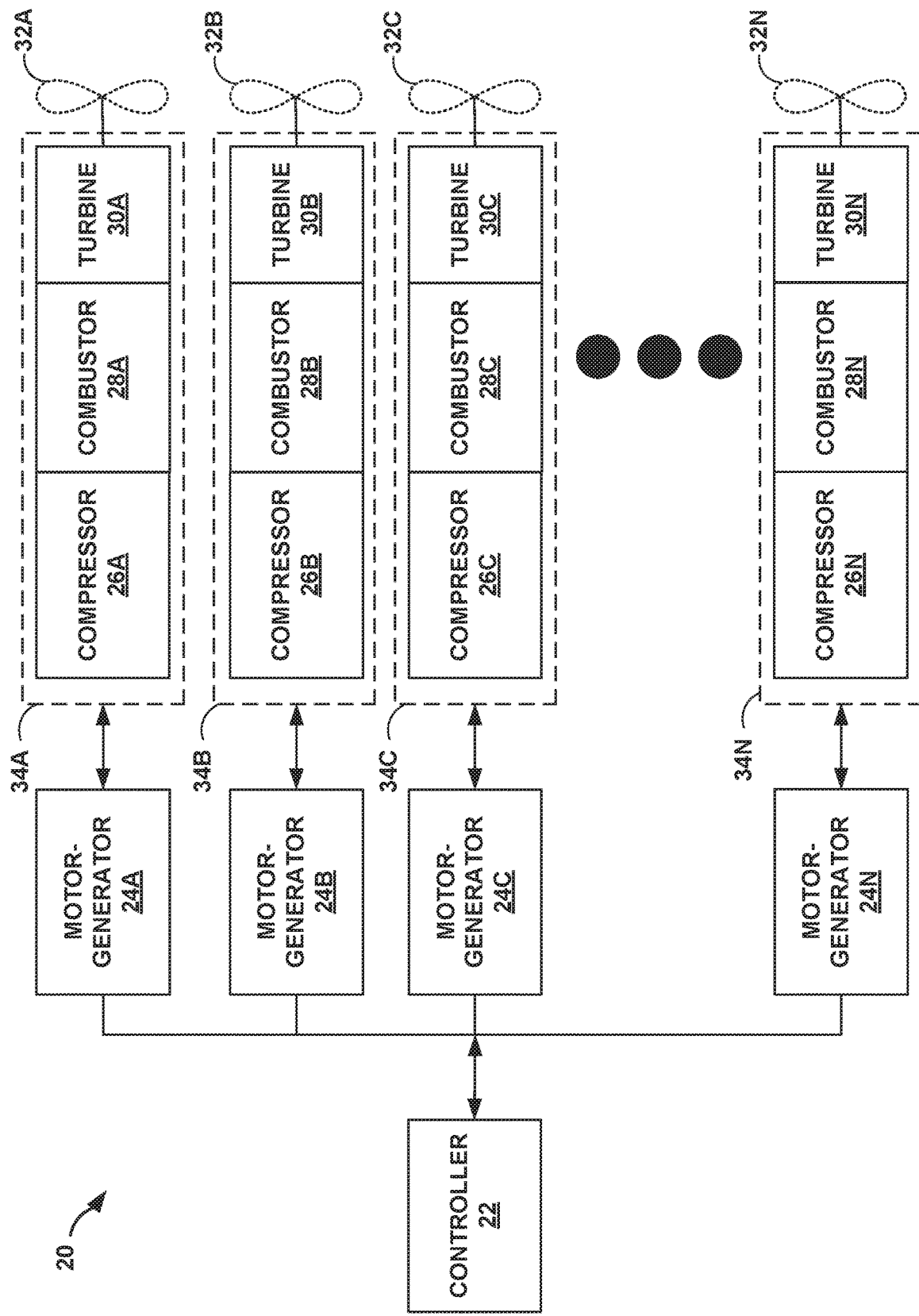
FIG. 2 is a conceptual block diagram illustrating a system with at least two gas turbine engines and at least two motor-generators, in accordance with one or more techniques of this disclosure.

Central compressor 6 may be configured to compress fluid, such as air or another gas and selectively provide the compressed fluid to combustors 10. Although not shown in FIG. 1, central compressor 6 may be operably coupled to a turbine, e.g., by a shaft, and may include a combustor in the fluidic path between central compressor 6 and the turbine operably coupled to central compressor 6. Central compressor 6 may receive fluid from an intake, compress the fluid, and distribute compressed fluid to each combustor of combustors 10. In some examples, central compressor 6 may include a single compressor remote from turbines 12, such as at a central location in system 2, although the term "central" does not necessarily refer to the physical location of central compressor 6 in system 2. Rather, the term "central" refers to the fact that a single compressor selectively provides compressed fluid to all turbines 12 in system 2. In some examples, central compressor 6 may include at least two central compressors. In still other examples, as shown in FIG. 2, a system may include a plurality of compressors, each of which may be fluidically coupled to a respective combustor 10. Central compressor 6 may be an axial compressor, a centrifugal compressor, or another type of compressor that produces compressed fluid.

Motor-generators 8 may be configured to convert electrical energy to mechanical energy to drive a respective turbine of turbines 12 or a respective propulsor of propulsors 14. Motor-generators 8 may be further configured to convert mechanical energy from a respective turbine of turbines 12 or a respective propulsor of propulsors 14 to electrical energy. Each motor-generator of motor-generators 8 may be operably coupled to a respective turbine of turbines 12 and a respective propulsor of propulsors 14. The terms "electrical power" and "mechanical power" may refer to rates of consuming or generating electrical energy or mechanical energy.

In some examples, motor-generators 8 may be configured to receive and convert direct-current (DC) electrical power to alternating-current (AC) electrical power, related to component speeds, to mechanical power in the form of a rotating shaft in the motor using electromagnetic forces. The AC electrical power may have a single phase or multiple phases, such as three-phase AC electricity. Each motor-generator of motor-generators 8 may be coupled to an inverter (not shown in FIG. 1) that converts AC electricity to DC electricity, or vice versa. In some examples, the inverter may be electrically coupled to a power bus that connects motor-generators 8, energy storage, and electrical loads within system 2. Each motor-generator may be coupled to a respective turbine of turbines 12 by a shaft of the respective turbine, directly or indirectly. For example, magnets or magnetic coils may be embedded or coupled to in the shaft of the turbine, and the stator of the motor-generator may surround the shaft, such that the shaft is a rotor of the motor-generator. As another example, a motor-generator may include a motor shaft that is coupled to the turbine shaft by one or more gears, a spline, or the like.

In some examples, combustors 10 may be configured to receive compressed fluid from central compressor 6. Each combustor of combustors 10 may be fluidically coupled to central compressor 6 and a respective turbine of turbines 12. An inlet of a combustor of combustors 10 may receive the compressed fluid via a valve, such as a bleed valve, from an outlet of central compressor 6 (e.g., an outlet of the turbine operably coupled to central compressor 6). Combustors 10 may be further configured to introduce fuel to and ignite the compressed fluid. The energy generated by igniting the compressed fluid in each combustor of combustors 10 may be extracted by the respective turbines of turbines 12, causing a shaft to which each respective turbine is coupled to rotate, thereby driving the respective propulsors of propulsors 14.

Turbines 12 may be fluidically coupled to combustors 10 such that each turbine of turbines 12 receives moving, combusted fluid from each respective combustor of combustors 10 and converts energy of the moving fluid to mechanical energy (a rotating shaft). The rotating shaft of each respective turbine of turbines 12 may drive a respective propulsor of propulsors 14 to produce propulsion for system 2. Turbines 12 may include any suitable type of turbine.

In some examples, each propulsor of propulsors 14 may be driven by a respective turbine of turbines 12, a respective motor-generator of motor-generators 8, or both. In some examples, one or more propulsor of propulsors 14 (e.g., propulsor 14E in FIG. 1) may be connected to a respective motor-generator 8E without being connected to a turbine of turbines 12 and be configured to be driven by only electrical power, which motor-generator 8E may convert to mechanical power. System 2 also may be configured to extract energy from fluid moving past propulsors 14 during windmilling. During windmilling, rotation of a respective propulsor of propulsors 14 causes rotation of the respective turbine operably coupled to the respective propulsor. The respective motor-generator of motor-generators 8 coupled to the respective turbine may convert the mechanical power of the turbine to electrical power for energy storage, provision to electrical loads within system 2, or provision to one or more other motor-generator of motor-generators 8.

Controller 4 is configured to individually and selectively control the components of system 2 such that system 2 implements the techniques described herein. For example, controller 4 may be configured to control how and when the components in system 2 consume, generate, and distribute mechanical power and electrical power for propulsion, electrical loads such as cabin comfort systems, electrical aviation systems, or other loads added to the system. By individually and selectively controlling the components of system 2 to manage how and when the components in system 2 consume, generate, and distribute mechanical power and electrical power, controller 4 may facilitate techniques such as vectoring propulsion across propulsors 14; providing additional transient propulsion, e.g., during situations requiring bursts of higher acceleration; providing additional transient electrical power, e.g., during situations requiring bursts of additional electrical power; operating system 2 in an electrical-only or fuel-only operating mode; operating one or more of turbines 12 using only electrical power (provided by respective motor-generators 8) and one or more other turbines 12 using only fuel; causing one or more of propulsors 14 to windmill and the motor-generator(s) of motor generators 8 coupled to the one or more of propulsors 14 to extract electrical power for powering others of motor-generators 8 or storage in an energy storage unit; causing one or more of turbines 12 to cease operating (under both electrical power and fuel) while causing one or more other turbines 12 to operate (using one or both of electrical power and fuel) to reduce energy usage when possible; or the like. In this way, system 2 and controller 4 provide a highly flexible electrical and mechanical power system for propulsion, energy generation, and the like.

In some examples, controller 4 may be configured to selectively and individually cause a respective turbine of turbines 12 to drive a respective propulsor of propulsors 14 by expanding combusted gases received from a respective combustor of combustors 10. Controller 4 may be further configured to selectively and individually cause a respective motor-generator of motor-generators 8 to drive a respective turbine of turbines 12 and a respective propulsor of propulsors 14. Controller 4 may be further configured to selectively and individually cause a motor-generator of motor-generators 8 to convert mechanical energy from a respective turbine of turbines 12 and a respective propulsor of propulsors 14 to electrical energy, e.g., during a windmilling event or when the respective turbine is expanding combusted gases received from the respective combustor to which the respective turbine is fluidically coupled.

For example, controller 4 may selectively cause central compressor 6 to provide compressed fluid to one or more of combustors 10 and may control the one or more of combustors 10 to combust the compressed fluid so that one or more turbines of turbines 12 can extract mechanical power from combusted fluid, e.g., to provide shaft power to the respective propulsors of propulsors 14 and provide propulsion to system 2. In this way, controller 4 may selectively cause the one or more turbines to run on fuel. Controller 4 also may selectively cause one or more motor-generators of motor-generators 8 to utilize electrical power (e.g., from energy storage or another motor-generator of motor generators 8) to drive the respective turbines of turbines 12. In this way, controller 4 may selectively cause one or more turbines of turbines 12 to run on electrical power. Controller 4 also may selectively cause one or more motor-generators of motor-generators 8 to convert mechanical power from one or more of the respective turbines of turbines 12 to electrical power, which controller 4 may cause to be provided to another one or more motor-generators of motor-generators 8 (e.g., to power the respective turbines of turbines 12 to which the another one or more motor-generators of motor-generators 8 are operably coupled) or to energy storage (e.g., a battery).

In some examples, controller 4 may substantially simultaneously control at least one of central compressor 6, one or more valves between central compressor 6 and combustors 10, each respective combustor of combustors 10, each respective turbine of turbines 12, and each respective motor-generator of motor-generators 8 independently, such that respective ones of the turbines and respective ones of the motor-generators may be operating similarly or differently. For example, to generate propulsion for system 2, controller 4 may cause central compressor 6 to distribute compressed fluid to one or more combustor of combustors 10 to drive one or more respective turbines of turbines 12 and one or more respective propulsors of propulsors 14 with mechanical power. To increase the propulsion generated by propulsors, controller 4 may cause energy storage to release electrical energy to one or more motor-generators of motor-generators 8 to convert to mechanical power to drive respective turbines 12 and respective propulsors 14.

Controller 4 may be further configured to recharge energy storage within system 2 through various techniques. In some examples, controller 4 may cause one or more combustor of combustors 10 to cease operating or may cause central compressor 6 to not provide compressed fluid to one or more combustor of combustors 10. This may cause one or more propulsors of propulsors 14 to windmill, which converts energy from fluid moving past the one or more propulsors into rotation of the one or more propulsors (which causes the shaft of the respective turbine(s) coupled to the one or more propulsors to rotate). Controller 4 may cause one or more respective motor-generators of motor-generators 8 to convert the mechanical power from the one or more propulsors to electrical power. Controller 4 may direct energy storage within system 2 to store the electrical energy.

In some examples, controller 4 may cause central compressor 6 and combustors 10 to continue operating to generate mechanical power at one or more turbines of turbines 12. Controller 4 may cause one or more respective motor-generators of motor-generators 8 to convert some or all of the mechanical power from the one or more turbines to electrical power. Controller 4 may direct energy storage within system 2 to store the electrical energy. Alternatively or additionally, controller 4 may cause one or more motor-generators of motor-generators 8 to convert the electrical power (extracted by another one of motor-generators 8) to mechanical power for propulsion.

In some examples, controller 4 may be configured to vector propulsion within system 2 by causing some of propulsors 14 to produce more propulsion and causing other propulsors of propulsors 14 to produce less propulsion. For example, controller 4 may cause central compressor 6 to distribute unequal amounts of compressed fluid to combustors 10. As another example, controller 4 may cause combustors 10 to produce unequal amounts of the mechanical power by causing some of combustors 10 to consume fuel at higher rates and causing other combustors of combustors 10 to consume fuel at lower rates. As another example, controller 4 may cause turbines 12 to operate at unequal rates by controlling some of motor-generators 8 to convert electrical power to mechanical power at increased rates and causing other motor-generators of motor-generators 8 to convert electrical power to mechanical power at reduced rates. Controller 4 may cause a motor-generator of motor-generators 8 to convert electrical power to mechanical power to increase the mechanical power of a respective turbine of turbines 12. The increased mechanical power of the respective turbine may cause a respective propulsor of propulsors 14 to generate increased propulsion relative to propulsion generated by the other propulsors of propulsors 14. This may allow increased turning rates, improved response times, and/or more agile operations of an airframe to which system 2 is coupled.

Controller 4 may comprise any suitable arrangement of hardware, software, firmware, or any combination thereof, to perform the techniques attributed to controller 4 herein. Examples of controller 4 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 4 includes software or firmware, controller 4 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 4 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 4 (e.g., may be external to a package in which controller 4 is housed).

Although controller 4 is generally described as being the primary unit for controlling each of the components of system 2 for performing the techniques described herein, in some examples, the individual components of system 2 may include additional functionality for performing some or all of the operations described below with respect to controller 4. For example, a combination of one or more of central compressor 6, combustors 10, turbines 12, and propulsors 14 may include components for controlling the consumption, generation, and distribution of energy throughout system 2.

Controller 4 may be configured to control propulsion by selectively causing individual propulsors of propulsors 14 to be driven by mechanical power from respective turbines of turbines 12, electrical power provided to respective motor-generators of motor-generators 8, or both mechanical power from the respective turbines and electrical power provided to the respective motor-generators. In some examples, controller 4 may be configured to cause energy to be stored within system 2 by converting mechanical energy from propulsors 14 or turbines 12 to electrical energy. Controller 4 may be further configured to vector propulsion by causing one or more propulsors of propulsors 14 to operate at unequal rates by controlling the mechanical power provided by the respective turbines of turbines 12 and the respective motor-generators of motor-generators 8 to the one or more propulsors.

Thus, according to the techniques of this disclosure, the controller may individually control the components of system 2 to operate on fuel, operate on electrical power, to generate electrical power, or to be disabled. The techniques of this disclosure may enable a versatile system 2 with multiple power sources and multiple modes of operation.

FIG. 2 is a conceptual block diagram illustrating a system 20 with at least two gas turbine engines 34A-34N (collectively, "gas turbines engines 34") and at least two motor-generators 24A-24N (collectively, "motor-generators 24"), in accordance with one or more techniques of this disclosure. System 20 may be any system implementing at least two gas turbine engines, such as an aircraft, a locomotive, a watercraft, or an electric generator.

Each gas turbine engine of gas turbine engines 34 may include a respective compressor of at least two compressors 26A-26N (collectively, "compressors 26"), a combustor of at least two combustors 28A-28N (collectively, "combustors 28"), and a turbine of at least two turbines 30A-30N (collectively, "turbines 30"). Each gas turbine engine of gas turbine engines 34 may be operably coupled to a respective motor-generator of motor-generators 24 and a respective propulsor of at least two propulsors 32A-32N (collectively, "propulsors 32").

Each compressor of compressors 26 may be configured to compress fluid, such as air or another gas and selectively provide the compressed fluid to a respective combustor of combustors 28. Although not shown in FIG. 2, each compressor of compressors 26 may be operably coupled to a respective turbine of turbines 30, e.g., by a shaft, and may include a respective combustor of combustors 28 in the fluidic path between the compressor and the respective turbine operably coupled to the respective compressor. A compressor of compressors 26 may receive fluid from an intake, compress the fluid, and distribute compressed fluid to a respective combustor of combustors 28. The combustor may selectively combust the fluid, which then flows to a respective turbine of turbines 30. Each compressor of compressors 26 may be any type of compressor that produces compressed fluid.

In this way, unlike system 2 of FIG. 1, system 20 includes a plurality of integrated gas turbine engines 34, each with at least one compressor, at least one combustor, and at least one turbine. Other components within system 20 may operate in a similar manner to the components within system 2, as depicted in FIG. 1. For example, controller 22, motor-generators 24, combustors 28, turbines 30, and propulsors 32 may operate in a similar manner to controller 4, motor-generators 8, combustors 10, turbines 12, and propulsors 14, respectively.

FIGS. 1 and 2 have described operation of systems 2 and 20 in general. To more fully illustrate some examples of the disclosure, FIGS. 3-8 illustrate example systems operating in particular modes of operation enabled by the techniques of this disclosure. A person having ordinary skill in the art will understand that the examples illustrated in FIGS. 3-8 are not the only examples enabled by the techniques described in this disclosure, and that the systems described herein (including any of the systems of FIGS. 1-8) may combine the techniques described herein in other ways to operate in other operating modes.

Figure 3:
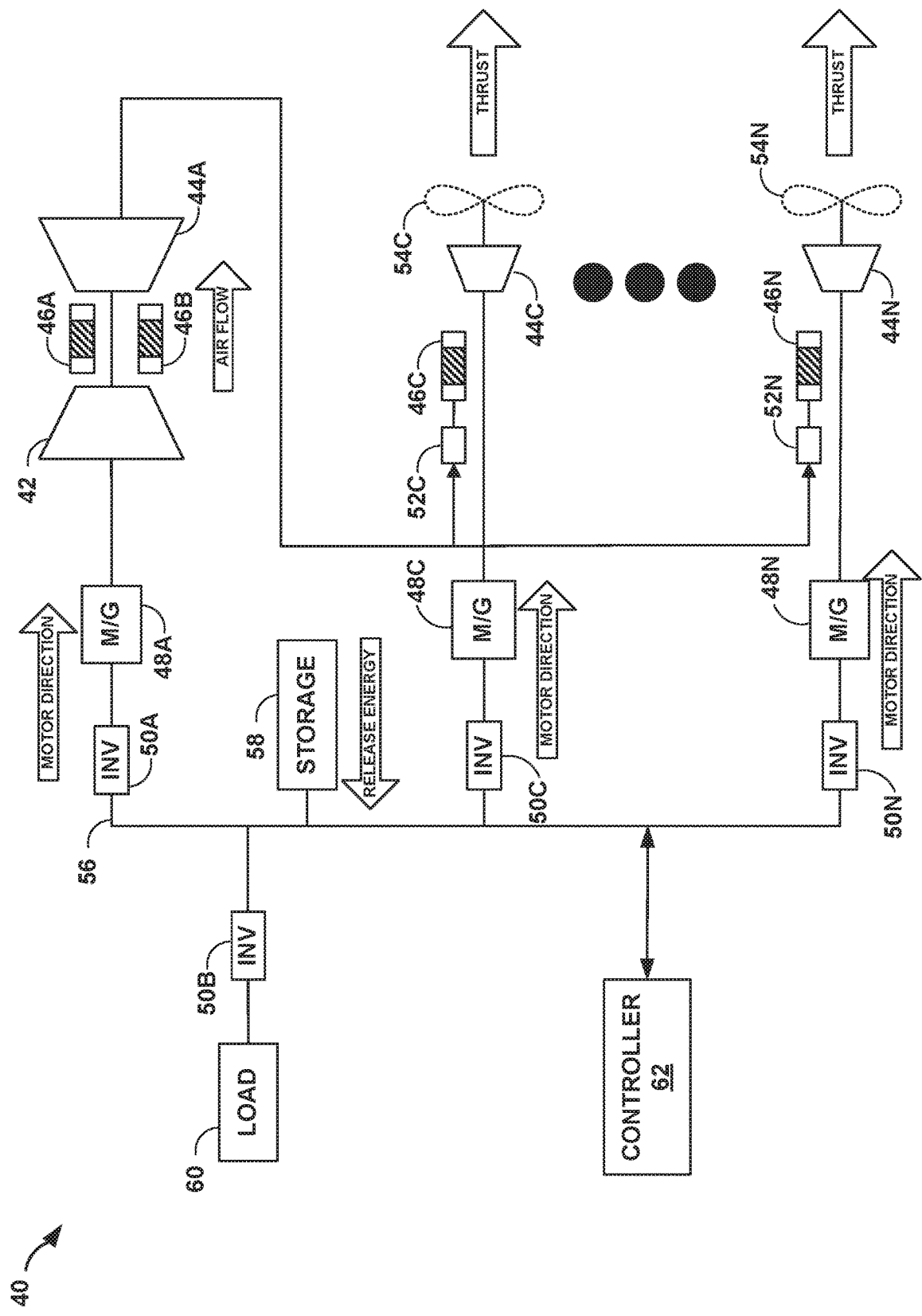
FIG. 3 is a conceptual block diagram illustrating an example system during a high propulsion event, such as takeoff, landing, or the like, in accordance with one or more techniques of this disclosure.

FIG. 3 is a conceptual block diagram illustrating an example system 40 during a high propulsion event, such as takeoff, landing, or the like, in accordance with one or more techniques of this disclosure. In some examples, system 40 may be any system implementing at least two turbines, such as an aircraft, a locomotive, a watercraft, an electric generator, or the like.

Within system 40, each motor-generator of at least two motor-generators 48A-48N (collectively, "motor-generators 48") may be operably coupled to a respective turbine of at least two turbines 44A-44N (collectively, "turbines 44"), as described above with respect to FIG. 1. Each turbine of turbines 44 may be operably coupled to a respective propulsor of at least two propulsors 54A-54N (collectively, "propulsors 54"). Although FIG. 3 depicts system 40 with one controller 62 and one central compressor 42, in other examples, system 40 may include more than one controller 62, more than one central compressor 42, or both. Similarly, system 40 may contain more or fewer than two of each of motor-generators 48, combustors 46A-46N (collectively, "combustors 46"), turbines 44, and propulsors 54.

Central compressor 42 may be configured to compress fluid, such as air or another gas, and selectively provide the compressed fluid to respective ones of combustors 46. Central compressor 42 may be operably coupled to turbine 44A, e.g., by a shaft, and may include one or more combustors 46A, 46B in the fluidic path between compressor 42 and turbine 44A. Compressor 42 may receive fluid from an intake and compress the fluid. The compressed fluid may flow to one or more combustors 46A, 46B, be combusted, and flow through turbine 44A. Turbine 44A may extract some energy from the fluid and drive compressor 42. The compressed fluid exiting from turbine 44A may be selectively distributed to each combustor of combustors 46. In some examples, central compressor 42 may include a single compressor remote from turbines 44, such as at a central location in system 40, although the term "central" does not necessarily refer to the physical location of central compressor 42 in system 40. Rather, the term "central" refers to the fact that a single compressor selectively provides compressed fluid to all turbines 44 in system 40. In some examples, central compressor 42 may include at least two central compressors. In still other examples, such as system 20 in FIG. 2, a system may include a plurality of compressors, each of which may be fluidically coupled to a respective combustor of combustors 46. In a system including a plurality of compressors, each compressor of the plurality of compressors may be coupled to a combustor of combustors 46 and a turbine of turbines 44 to form a gas turbine engine, similar to gas turbine engines 34, where each gas turbine engine includes a compressor.

Each combustor of combustors 46 may be configured to receive compressed fluid from central compressor 42. An inlet of each combustor may receive the compressed fluid via a valve of at least two valves 52C-52N (collectively, "valves 52"), such as a bleed valve, a ball valve, or a needle valve, from an outlet of central compressor 42 (e.g., of turbine 44A). Combustors 46 may be further configured to introduce fuel to and ignite the compressed fluid. The energy generated by igniting the compressed fluid in a combustor of combustors 46 may be extracted by a respective turbine of turbines 44, causing a shaft to which the respective turbine is coupled to rotate, thereby driving a respective propulsor of propulsors 54.

Motor-generators 48 may be configured to convert electrical energy to mechanical energy to drive a respective turbine of turbines 44 or a respective propulsor of propulsors 54. Motor-generators 48 may be further configured to convert mechanical energy from a respective turbine of turbines 44 or a respective propulsor of propulsors 54 to electrical energy. Each motor-generator 48 may be operably coupled to a respective turbine of turbines 44 and a respective propulsor of propulsors 54, as described above with respect to FIG. 1.

In some examples, motor-generators 48 may be configured to receive and convert AC inverter-controlled electricity to mechanical power in the form of a rotating shaft. Each motor-generators 48 may be coupled to a respective inverter of inverters 50A-50N (collectively, "inverters 50") that converts AC electricity to direct-current (DC) electricity, or vice versa. In some examples, an inverter of inverters 50 may be electrically coupled to power bus 56 connecting inverters 50 and energy storage 58 within system 40. Motor-generators 48 and electrical load 60 may be connected to power 56 via inverters 50.

Electrical load 60 may be coupled to power bus 56 by inverter 50B. In some examples, electrical load 60 may include at least two electrical loads coupled to power bus 56 by at least two inverters of inverters 50. In some examples, electrical load 60 may be coupled directly to power bus 56 to receive DC electricity. Electrical load 60 may include any type of electrical load, such as a cabin load, an interior lighting and display system, a heating and cooling system, or other loads added by the system designer.

Controller 62 is configured to individually and selectively control the components of system 40 such that system 40 implements the techniques described herein, including those described above with respect to FIG. 1. Controller 62 may be configured to selectively cause central compressor 42 to provide compressed fluid to one or more of combustors 46 and may control the one or more of combustors 46 to combust the compressed fluid so that one or more turbines of turbines 44 can extract mechanical power from combusted fluid, e.g., to provide shaft power to the respective propulsors of propulsors 54 and provide propulsion to system 40. In this way, controller 62 may selectively cause the one or more turbines to run on fuel. Controller 62 also may selectively cause one or more motor-generators of motor-generators 48 to utilize electrical power (e.g., from energy storage or another motor-generator of motor generators 48) to drive the respective turbines of turbines 44. In this way, controller 62 may selectively cause one or more turbines of turbines 44 to run on electrical power. Controller 62 may be further configured to selectively cause a motor-generator of motor-generators 48 to convert mechanical energy from a respective turbine of turbines 44 and a respective propulsor of propulsors 54 to electrical energy, e.g., during a windmilling event or when the respective turbine is expanding combusted gases received from the respective combustor to which the respective turbine is fluidically coupled.

During a high propulsion event, such as takeoff, landing, or the like, controller 62 may cause system 40 to provide high total propulsion by causing compressor 42 to compress fluid for combustors 46. Controller 62 may open valves 52, causing compressed fluid to be distributed to combustors 46, powering turbines 44 and propulsors 54. Additionally, controller 62 may cause energy storage 58 to release electricity to motor-generators 48 via inverters 50. Controller 62 may cause motor-generators 48 to convert electrical power to mechanical power to provide additional propulsion to system 40 during a high propulsion event, such as takeoff or landing. As a result, controller 62 may cause propulsors 54 may operate on both fuel and electrical power during a high propulsion event, such as takeoff or landing.

Figure 4:
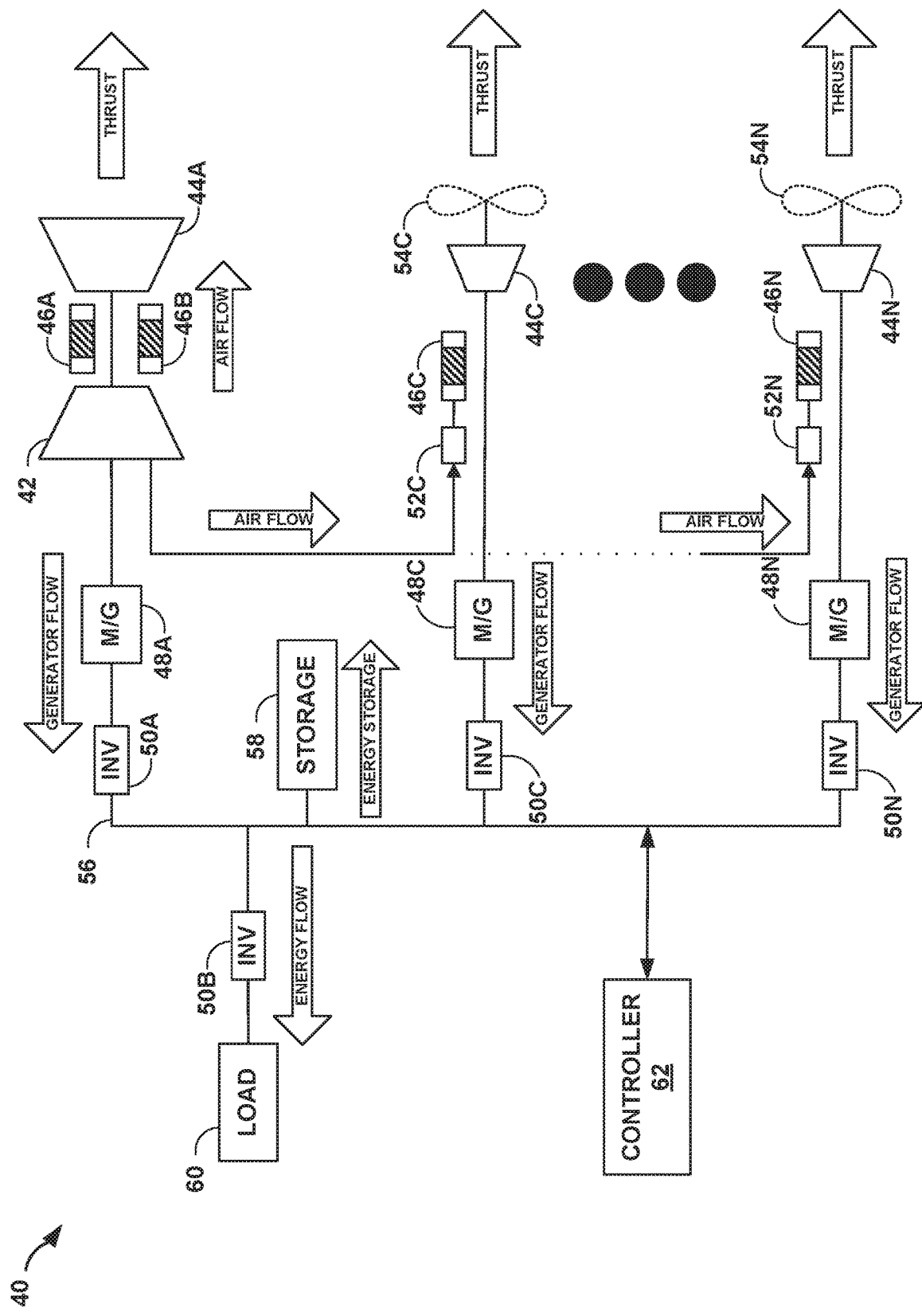
FIG. 4 is a conceptual block diagram illustrating an example system operating during cruise or another low propulsion event, in accordance with one or more techniques of this disclosure.

FIG. 4 is a conceptual block diagram illustrating example system 40 operating during cruise or another low propulsion event, in accordance with one or more techniques of this disclosure. During cruise, controller 62 may cause central compressor 42 and combustors 46 to continue operating to generate mechanical power at one or more turbines of turbines 44. Controller 62 may cause combustors 46 to combust compressed fluid so that turbines 44 can extract mechanical power from combusted fluid to provide shaft power to propulsors 54 and provide propulsion to system 40. In some examples, system 40 may implement the techniques of FIG. 4 through a plurality of integrated gas turbine engines, such as gas turbine engines 34 in FIG. 2, where each gas turbine engine has a compressor.

In addition, controller 62 may cause one or more respective motor-generators of motor-generators 48 to convert some or all of the mechanical power from the one or more turbines to electrical power. Controller 62 may direct energy storage 58 within system 40 to store the electrical energy. Controller 62 may cause system 40 to refill energy storage 58 during cruise when system 40 may need reduced propulsion to maintain velocity, as compared to takeoff or landing. Controller 62 may disable one or more turbines of propulsors 54 while other propulsors are powered by respective turbines of turbines 44. Alternatively or additionally, controller 62 may cause one or more propulsors of propulsors 54 to windmill to generate electrically energy while other propulsors are powered by respective turbines of turbines 44.

Figure 5:
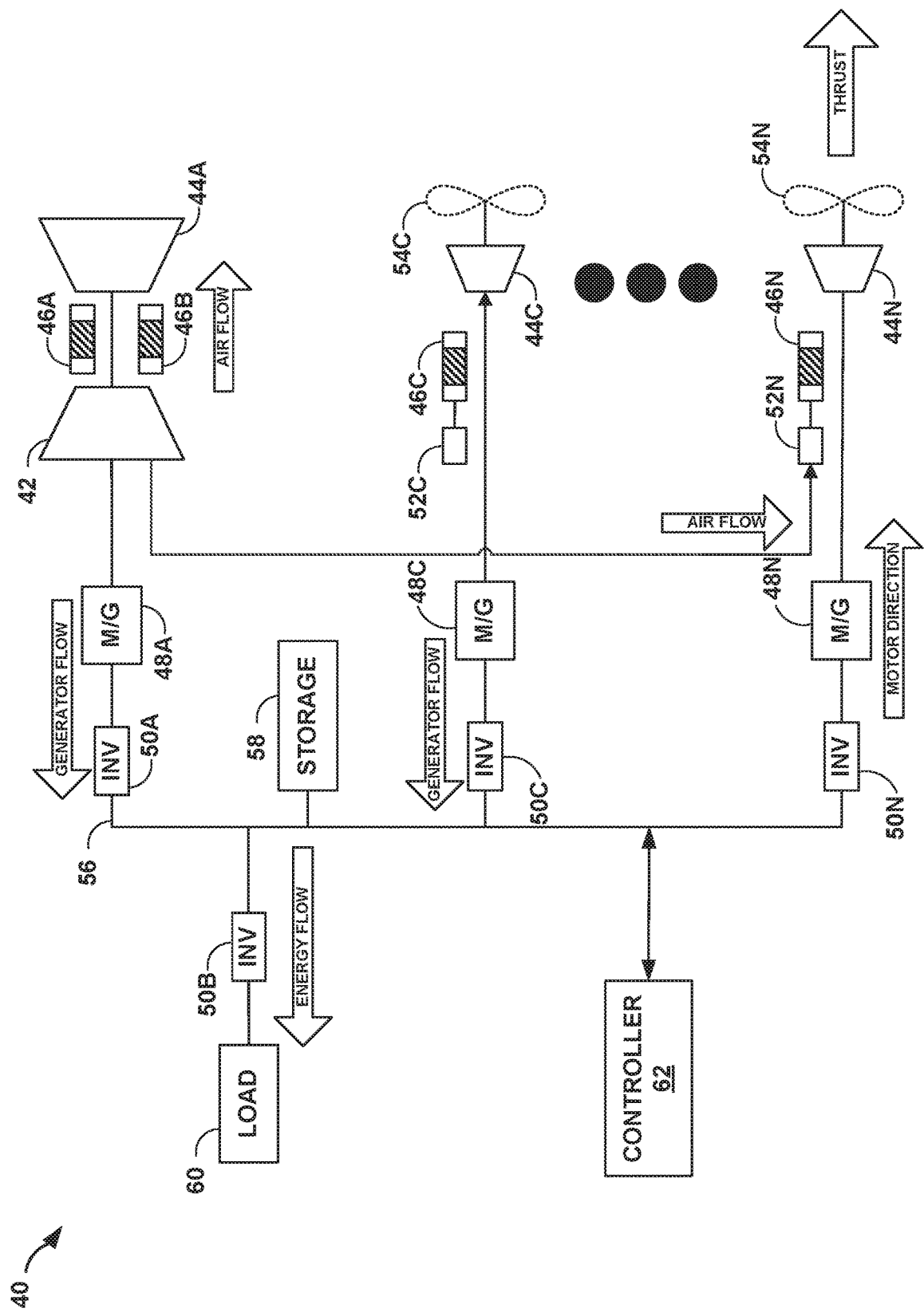
FIG. 5 is a conceptual block diagram illustrating an example system employing vectored propulsion, in accordance with one or more techniques of this disclosure.

FIG. 5 is a conceptual block diagram illustrating example system 40 employing vectored propulsion, in accordance with one or more techniques of this disclosure. Controller 62 may be configured to vector propulsion within system 40 by causing some of propulsors 54 to operate at increased rates and causing other propulsors of propulsors 54 to operate at reduced rates. In some examples, system 40 may implement the techniques of FIG. 5 through a plurality of integrated gas turbine engines, such as gas turbine engines 34 in FIG. 2, where each gas turbine engine has a compressor.

For example, controller 62 may cause compressor 42 to distribute unequal amounts of compressed fluid to combustors 46. Controller 62 may cause combustors 46 to produce unequal amounts of the mechanical power by causing combustor 46N to consume fuel at a greater rate and causing combustor 46C to consume fuel at a lesser rate. Controller 62 may open or close one or more valves of valves 52 to control the flow of compressed fluid. Controller 62 may selectively cause motor-generator 48C to convert mechanical power from propulsor 54C to electrical power, which controller 62 may cause to be provided, by power bus 56, to another motor-generator 48N to power turbine 44N. The increased mechanical power of turbine 44N may cause a propulsor 54N to generate increased propulsion, as compared to the propulsion generated by the other propulsors of propulsors 54, such as propulsor 54C. Vectoring propulsion may cause system 40 to execute a flight maneuver, such as a turn or a roll. Controller 62 also may selectively disable one or more propulsors of propulsors 54 to reduce propulsion. Alternatively or additionally, controller 62 may cause one or more propulsors of propulsors 54 to windmill to reduce propulsion and possibly generate mechanical power.

In some examples, controller 62 may also open valve 52C to allow the flow of compressed fluid to combustor 46C. Controller 62 may cause combustor 46C to consume fuel at a rate approximately equal to combustor 46N. Controller 62 may cause motor-generator 48C to convert some or all of the mechanical power from turbine 44C to electrical power, thereby reducing the mechanical power provided by turbine 44C to propulsor 54C for propulsion. By comparison, controller 62 may cause motor-generator 48N to convert electrical power to mechanical power to increase the propulsion at propulsor 54N. As a result, controller 62 may vector propulsion by controlling valves 52, motor-generators 48, or both.

Figure 6:
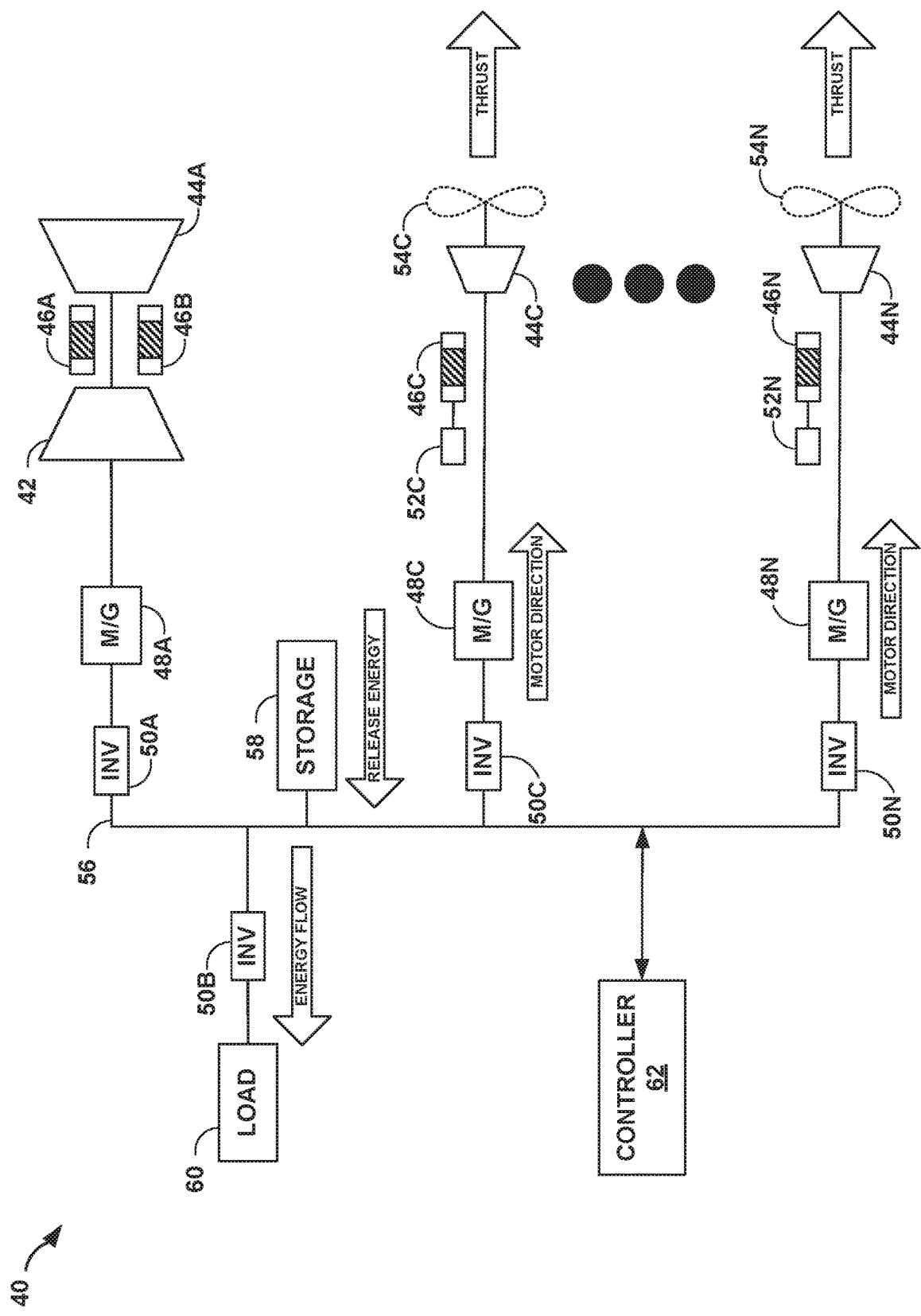
FIG. 6 is a conceptual block diagram illustrating an example system running on fully electrical power, in accordance with one or more techniques of this disclosure.

FIG. 6 is a conceptual block diagram illustrating example system 40 running fully on electrical power, in accordance with one or more techniques of this disclosure. System 40 may operate on electrical power for any of a variety of purposes, such as to reduce fuel consumption, because of a component failure within system 40, to reduce an acoustic profile of system 40. In a stealth mode of operation, controller 62 may disable compressor 42 and close valves 52 to prevent distribution of compressed fluid to combustors 46. To provide propulsion, controller 62 may selectively cause one or more motor-generators of motor-generators 48 to convert electrical power from energy storage 58 into mechanical power to drive the respective turbines of turbines 44. In this way, controller 62 may selectively cause one or more turbines of turbines 44 to run on electrical power. In some examples, system 40 may implement the techniques of FIG. 6 through a plurality of integrated gas turbine engines, such as gas turbine engines 34 in FIG. 2, where each gas turbine engine includes a compressor.

Figure 7:
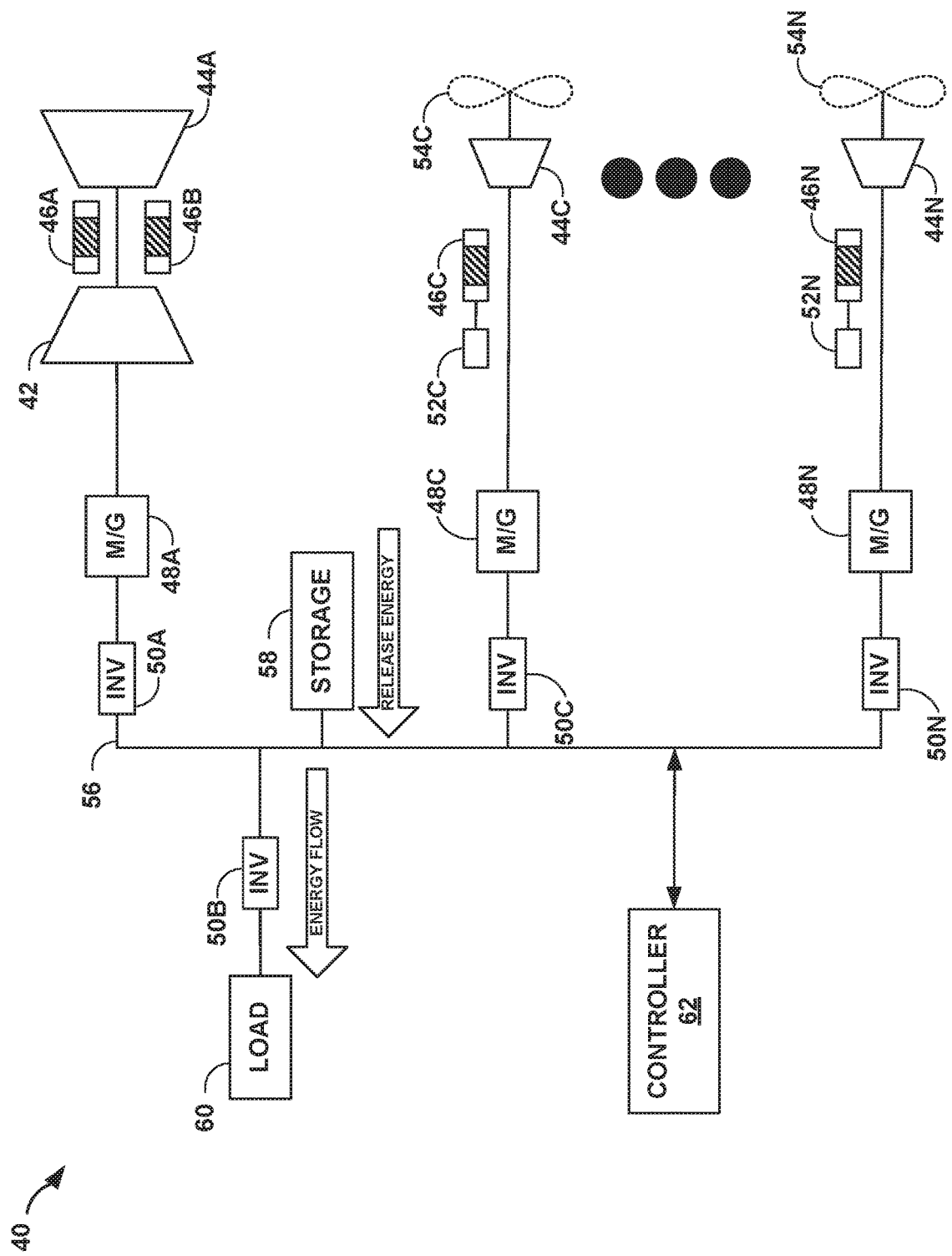
FIG. 7 is a conceptual block diagram illustrating an aircraft gliding and powering an electrical load using stored electrical energy, in accordance with one or more techniques of this disclosure.

FIG. 7 is a conceptual block diagram illustrating example system 40 gliding and powering an electrical load using stored electrical energy, in accordance with one or more techniques of this disclosure. Controller 62 may cause compressor 42 to disable and may close valves 52 to prevent distribution of compressed fluid to combustors 46. Energy storage 58 may release DC electricity to power bus 56 to supply power to electrical load 60 via inverter 50B. Thus, propulsors 54 may not operate on mechanical power or electrical power when system 40 is gliding and running on stored electrical energy. In some examples, system 40 may implement the techniques of FIG. 7 through a plurality of integrated gas turbine engines, such as gas turbine engines 34 in FIG. 2, where each gas turbine engine includes a compressor.

Figure 8:
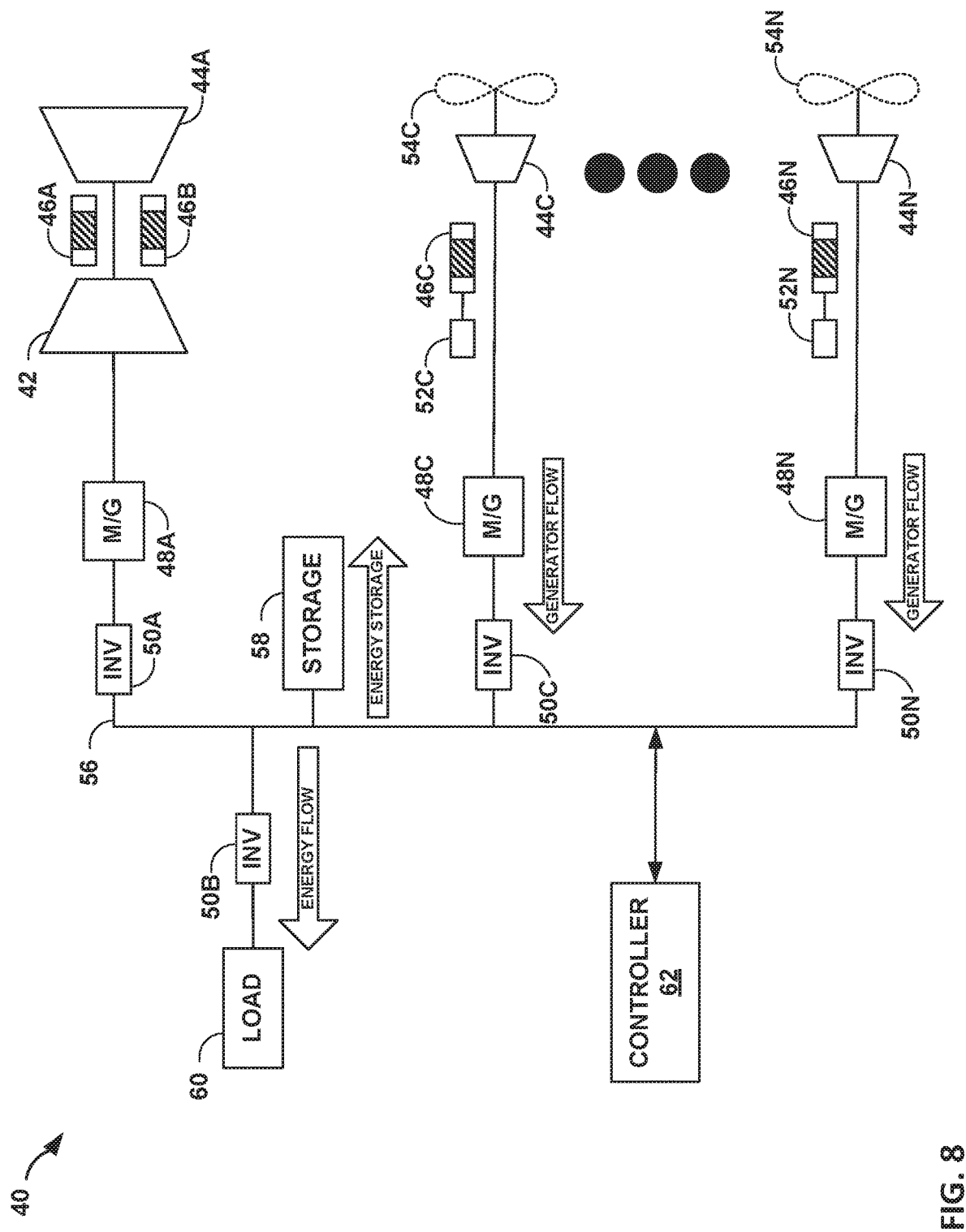
FIG. 8 is a conceptual block diagram illustrating an aircraft gliding and windmilling to generate electrical energy, in accordance with one or more techniques of this disclosure.

FIG. 8 is a conceptual block diagram illustrating example system 40 gliding and windmilling to generate electrical energy, in accordance with one or more techniques of this disclosure. Controller 62 may be configured to cause energy to be stored in energy storage 58 by converting mechanical energy from propulsors 54 to electrical energy. In some examples, controller 62 may cause central compressor 42 and combustors 46 to cease operating and may cause one or more propulsors of propulsors 54 to windmill to generate mechanical power. The one or more propulsors of propulsors 54 may extract energy from fluid moving past the one or more propulsors during windmilling. Controller 62 may cause one or more respective motor-generators of motor-generators 48 to convert the mechanical power from the one or more propulsors to electrical power. One or more inverters of inverters 50 may convert AC electricity to DC electricity for distribution on power bus 56. Controller 62 may direct energy storage 58 to store the electrical energy. In some examples, system 40 may implement the techniques of FIG. 8 through a plurality of integrated gas turbine engines, such as gas turbine engine 34 in FIG. 2.

In some examples, system 40 may have a finite amount of mechanical power available from combusting fuel for conversion into electrical power to power electrical load 60. In some examples, the mechanical power available from combusting fuel may be on the order of one or two megawatts. If electrical load 60 is an electrical system requiring a short, intense burst of power, system 40 may need additional power beyond one or two megawatts. System 40 may obtain additional power from a motor or ram air turbine at the tail end of system 40. This motor or ram air turbine may provide approximately one megawatt of power. By windmilling propulsors 54 to generate mechanical power, motor-generators 48 may provide an additional one or two megawatts of electrical power. The additional power may be utilized to provide short bursts of power to electrical load 60 or another device. When propulsors 54 are windmilling, system 40 may experience reduced aerodynamic performance, but an urgent demand for power by electrical load 60 may be more important than the short-term aerodynamic performance of system 40. Avoidance maneuvers and braking redundancy may be situations that cause an urgent demand for power.

Figure 9:
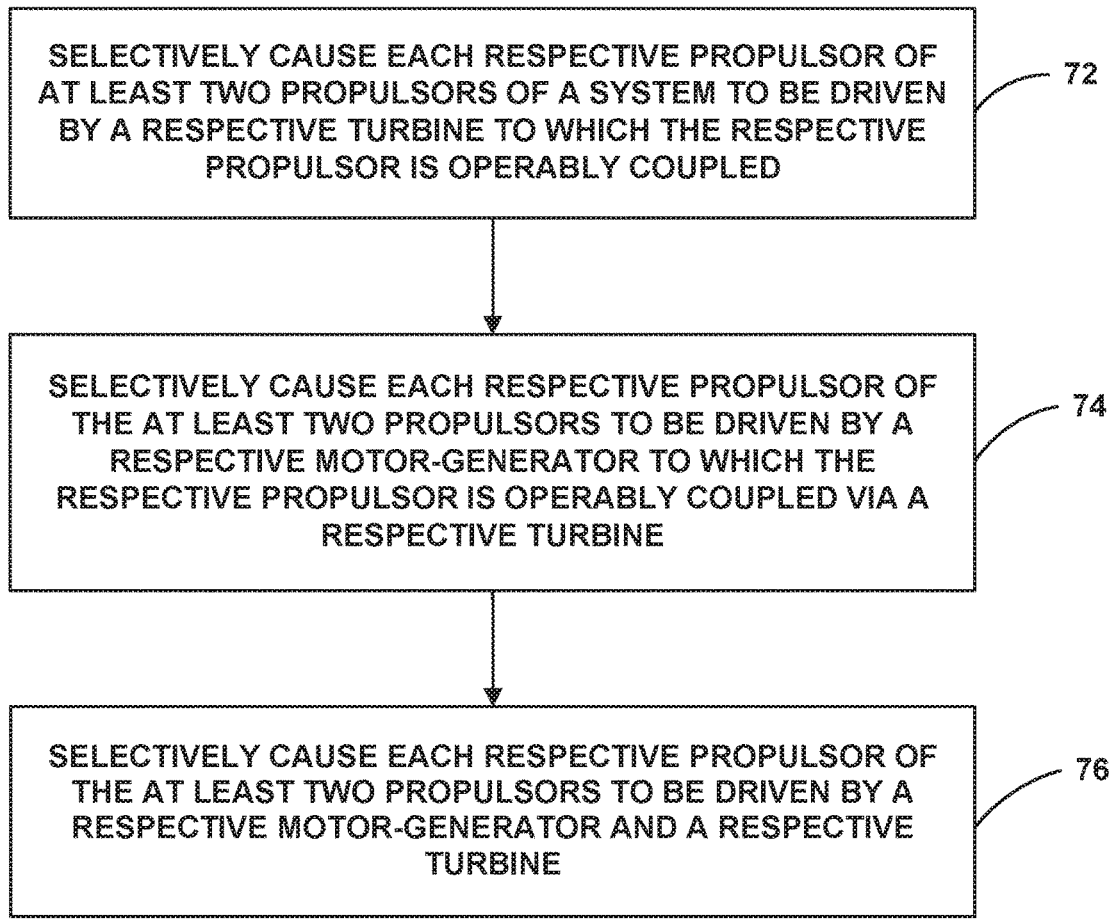
FIG. 9 is a flowchart illustrating an example technique implemented by a system with at least two motor-generators, in accordance with one or more techniques of this disclosure.

FIG. 9 is a flowchart illustrating an example technique implemented by a system with at least two motor-generators, in accordance with one or more techniques of this disclosure. The example technique is described with respect to the system of FIG. 1, including controller 4, although other components, such as controller 22 in FIG. 2 or controller 62 in FIG. 3, may perform similar techniques.

The technique of FIG. 9 includes selectively causing, by controller 4, each respective propulsor of at least two propulsors 14 of a system 2 to be driven by a respective turbine of at least two turbines 12 to which the respective propulsor is operably coupled (72). Controller 4 may cause central compressor 6 to compress fluid and distribute the compressed fluid to a respective combustor of combustors 8, to which the respective turbine is fluidically coupled. In some examples, controller 4 may cause a plurality of compressors to compress fluid and cause each compressor to distribute the compressed fluid to a respective combustor of a plurality of combustors. In single-compressor examples or multiple-compressor examples, Controller 4 may control combustors 10 to combust the compressed fluid so that turbines 12 can extract mechanical power from the combusted fluid to provide shaft power to propulsors 14 and provide propulsion to system 2. Thus, controller 4 may cause the respective propulsor to operate on fuel.

The technique of FIG. 9 also includes selectively causing, by controller 4, each respective propulsor of the at least two propulsors 14 to be driven by a respective motor-generator of at least two motor-generators 8 to which the respective propulsor is operably coupled via a respective turbine of the at least two turbines 12 (74). Controller 4 may cause the respective motor-generator to convert electrical power from a power bus to mechanical power in the form of a rotating shaft. Controller 4 may cause the respective motor-generator to drive the respective propulsor to provide propulsion. Thus, controller 4 may cause the respective propulsor to operate on electricity.

The technique of FIG. 9 also includes selectively causing, by controller 4, each respective propulsor of the at least two propulsors 14 to be driven by a respective motor-generator of the at least two motor-generators 8 and a respective turbine the at least two turbines 12 (76). Controller 4 may cause the respective turbine to operate on mechanical power from the respective combustor while simultaneously causing the respective motor-generator to operate on electrical power. Both the respective turbine and the respective motor-generator may provide mechanical power to the respective propulsor. Thus, controller 4 may cause the respective propulsor to operate on both fuel and electricity.

System 2 includes at least two turbines 12, at least two motor-generators 8, at least one compressor 6, and at least two combustors 10, wherein each respective turbine is fluidically coupled to a respective combustor of the at least two combustors 10. Each respective combustor is configured to receive compressed fluid from the at least one compressor 6. Each respective motor-generator is configured to convert electrical energy to mechanical energy to drive a respective propulsor to which the respective motor-generator is operably coupled and to convert mechanical energy from a respective turbine to which the respective motor-generator is operably coupled to electrical energy.

FIG. 9 has described the operation of system 2 in general. Controller 4, as well as controller 22, may selectively and individually control the components of system 2 and system 22 to cause propulsors 14 and propulsors 32 to be driven using mechanical power, electrical power, or both. FIGS. 3-8 more fully illustrate some examples of the disclosure, including systems operating in particular modes of operation enabled by the techniques of this disclosure. A person having ordinary skill in the art will understand that the technique described in FIG. 9 is not the only example enabled by the techniques described in this disclosure, and that the systems described herein (including any of the systems of FIGS. 1-8) may combine the techniques described herein in other ways to operate in other operating modes.

As described in the technique of FIG. 9, controller 2 may cause central compressor 6 to provide compressed fluid to one or more of combustors 10 and may control the one or more of combustors 10 to combust the compressed fluid so that one or more turbines of turbines 12 can extract mechanical power from combusted fluid, e.g., to provide shaft power to the respective propulsors of propulsors 14 and provide propulsion to system 2. Controller 4 also may selectively cause one or more motor-generators of motor-generators 8 to utilize electrical power (e.g., from energy storage or another motor-generator of motor generators 8) to drive the respective turbines of turbines 12. In this way, controller 4 may selectively cause one or more turbines of turbines 12 to run on electrical power. Alternatively or additionally, controller 2 may combine these techniques for a hybrid approach, causing one or more propulsors of propulsors 14 to be driven by both electrical and mechanical power.

Various examples have been described. These and other examples are within the scope of the following claims.

What is claimed is:

1. A system comprising:
   at least one compressor;
   at least two turbines;
   at least two combustors, wherein a respective combustor of the at least two combustors is fluidically coupled to a respective turbine of the at least two turbines, and wherein the at least two combustors are configured to receive compressed fluid from the at least one compressor;
   at least two motor-generators, wherein:
      each respective motor-generator of the at least two motor-generators is operably coupled to a respective turbine of the at least two turbines, and
      each respective motor-generator of the at least two motor-generators is configured to convert electrical energy to mechanical energy to drive a respective propulsor to which the respective motor-generator is operably coupled and to convert mechanical energy from a respective turbine to which the respective motor-generator is operably coupled to electrical energy; and
   at least two propulsors, wherein each respective propulsor of the at least two propulsors is operably coupled to a respective turbine of the at least two turbines, wherein each respective propulsor of the at least two propulsors is configured to be driven by the respective turbine to which the respective propulsor is operably coupled, a respective motor-generator to which the respective propulsor is operably coupled via the respective turbine, or both the respective turbine and the respective motor-generator.

2. The system of claim 1,
   wherein the at least one compressor comprises a single compressor remote from the at least two turbines, and wherein the single compressor is configured to distribute compressed fluid to each combustor of the at least two combustors.

3. The system of claim 2, further comprising:
   at least two valves, wherein a respective valve of the at least two valves is fluidically coupled between an outlet of the compressor and a respective inlet of a respective combustor.

4. The system of claim 1, wherein:
   the at least one compressor comprises at least two compressors; and
   each respective compressor of the at least two compressors is fluidically coupled to a respective combustor of the at least two combustors.

5. The system of claim 1, further comprising:
   a power bus configured to selectively receive direct-current electricity from each respective motor-generator of the at least two motor-generators and selectively provide direct-current electricity to each respective motor-generator of the at least two motor-generators.

6. The system of claim 1, further comprising a controller, wherein the controller is configured to:
   cause a first motor-generator of the at least two motor-generators to convert mechanical power from a first respective propulsor of the at least two propulsors, to which the first motor-generator is operably coupled via a first respective turbine of the at least two turbines, to electrical power; and
   substantially simultaneously cause a second motor-generator of the at least two motor-generators to convert electrical power to mechanical power to drive a second respective second propulsor of the at least two propulsors to which the second motor-generator is operably coupled via a second respective turbine of the at least two turbines.

7. The system of claim 1, further comprising a controller, wherein the controller is configured to:
   cause the at least one compressor to cease operating; and
   cause a motor-generator of the at least two motor-generators to convert electrical power to mechanical power to operate a respective propulsor of the at least two propulsors to which the motor-generator is operably coupled via a respective turbine of the at least two turbines.

8. The system of claim 1, further comprising a controller and a power bus, wherein the controller is configured to:
   cause a motor-generator of the at least two motor-generators to convert mechanical power from a respective propulsor of the at least two propulsors, to which the motor-generator is coupled via a respective turbine of the at least two turbines, to electrical power; and
   deliver the electrical power, via the power bus, to a load.

9. The system of claim 1, further comprising a controller, wherein the controller is configured to:
   vector propulsion by selectively delivering electrical power to less than all of the at least two motor-generators for conversion into mechanical power to drive less than all of the at least two propulsors to which the less than all of the at least two motor-generators are respectively operably coupled via respective turbines of the at least two turbines.

10. The system of claim 1, further comprising a controller, wherein:
   the at least one compressor comprises at least two compressors; and
   the controller is configured to:
      cause less than all of the at least two compressors to operate;
      cause a first turbine of the at least two turbines to drive a first respective propulsor of the at least two propulsors with mechanical power, wherein the first turbine is operably coupled to a first respective compressor of the at least two compressors that is operating; and
      cause a second motor-generator of the at least two motor-generators to convert electrical power to mechanical power to drive a second respective propulsor of the at least two propulsors that is coupled to a second respective compressor of the at least two compressors that is not operating.

11. The system of claim 1, further comprising a controller, wherein the controller is further configured to:
cause a first motor-generator of the at least two motor-generators to convert mechanical power generated by a first respective propulsor of the at least two propulsors, to which the first motor-generator is coupled via a first respective turbine of the at least two turbines, to electrical power; and
deliver the electrical power to a second motor-generator of the at least two motor-generators to convert to mechanical power to drive a second respective propulsor of the at least two propulsors to which the second motor-generator is coupled via a second respective turbine of the at least two turbines.

12. A controller configured to:
selectively cause each respective propulsor of at least two propulsors of a system to be driven by a respective turbine to which the respective propulsor is operably coupled;
selectively cause each respective propulsor of the at least two propulsors to be driven by a respective motor-generator to which the respective propulsor is operably coupled via the respective turbine; and
selectively cause each respective propulsor of the at least two propulsors to be driven by a respective motor-generator and a respective turbine, wherein the system includes at least two turbines, at least two motor-generators, at least one compressor, and at least two combustors, wherein each turbine is fluidically coupled to a respective combustor of the at least two combustors, wherein each respective combustor is configured to receive compressed fluid from the at least one compressor, and wherein each respective motor-generator is configured to convert electrical energy to mechanical energy to drive a respective propulsor to which the respective motor-generator is operably coupled and to convert mechanical energy from a respective turbine to which the respective motor-generator is operably coupled to electrical energy.

13. The controller of claim 12, wherein the at least one compressor comprises a single compressor remote from the at least two turbines, and wherein the controller is further configured to:
cause the single compressor remote from the at least two turbines to distribute compressed fluid to the respective combustors.

14. The controller of claim 12, further configured to:
distribute, via a power bus, direct-current electricity from a first respective motor-generator of the at least two motor-generators to a second motor-generator of the at least two motor-generators; and
cause the second motor-generator to convert the direct-current electricity to drive a second respective propulsor of the at least two propulsors to which the second motor-generator is operably coupled via a second respective turbine of the at least two turbines.

15. The controller of claim 12, further configured to:
cause the at least one compressor to cease operating; and
cause a motor-generator of the at least two motor-generators to convert electrical power to mechanical power to drive a respective propulsor of the at least two propulsors, to which the motor-generator is operably coupled via a respective turbine.

16. The controller of claim 12, further configured to:
vector propulsion by selectively delivering electrical power to less than all of the at least two motor-generators for conversion into mechanical power to drive less than all of the at least two propulsors to which the less than all of the at least two motor-generators are respectively operably coupled via respective turbines of the at least two turbines.

17. The controller of claim 12, wherein:
the at least one compressor comprises at least two compressors; and
the controller is further configured to:
cause less than all of the at least two compressors to operate;
cause a first turbine of the at least two turbines to drive a first respective propulsor of the at least two propulsors with mechanical power, wherein the first turbine is operably coupled to a first respective compressor of the at least two compressors that is operating; and
cause a second motor-generator of the at least two motor-generators to convert electrical power to mechanical power to operate a second respective propulsor of the at least two propulsors that is operably coupled to a second respective compressor of the at least two compressors that is not operating.

18. A method comprising:
selectively causing each respective propulsor of at least two propulsors of a system to be driven by a respective turbine to which the respective propulsor is operably coupled;
selectively causing each respective propulsor of the at least two propulsors to be driven by a respective motor-generator to which the respective propulsor is operably coupled via a respective turbine; and
selectively causing each respective propulsor of the at least two propulsors to be driven by a respective motor-generator and a respective turbine, wherein the system includes at least two turbines, at least two motor-generators, at least one compressor, and at least two combustors, wherein each respective turbine is fluidically coupled to a respective combustor of the at least two combustors, wherein each respective combustor is configured to receive compressed fluid from the at least one compressor, and wherein each respective motor-generator is configured to convert electrical energy to mechanical energy to drive a respective propulsor to which the respective motor-generator is operably coupled and to convert mechanical energy from a respective turbine to which the respective motor-generator is operably coupled to electrical energy.

19. The method of claim 18, further comprising:
distributing, via a power bus, direct-current electricity from a first respective motor-generator of the at least two motor-generators to a second motor-generator of the at least two motor-generators; and
causing the second motor-generator to convert the direct-current electricity to drive a second respective propulsor of the at least two propulsors to which the second motor-generator is operably coupled via a second respective turbine of the at least two turbines.

20. The method of claim 18, further comprising:
vectoring propulsion by selectively delivering electrical power to less than all of the at least two motor-generators for conversion into mechanical power to drive less than all of the at least two propulsors to which the less than all of the at least two motor-generators are respectively operably coupled via respective turbines of the at least two turbines.

\* \* \* \* \*